United States Patent
Raz et al.

(10) Patent No.: US 9,630,878 B2
(45) Date of Patent: Apr. 25, 2017

(54) CEMENTITIOUS BINDERS CONTAINING POZZOLANIC MATERIALS

(75) Inventors: Alon Raz, Tel Aviv (IL); Nechemia Masury, Netanya (IL)

(73) Assignee: GREEN BINDER TECHNOLOGIES LTD., Tel-Aviv (IL)

( * ) Notice: Subject to any disclaimer, the term of this patent is extended or adjusted under 35 U.S.C. 154(b) by 600 days.

(21) Appl. No.: 14/111,584

(22) PCT Filed: Apr. 15, 2012

(86) PCT No.: PCT/US2012/033705
§ 371 (c)(1),
(2), (4) Date: Jan. 11, 2014

(87) PCT Pub. No.: WO2012/142547
PCT Pub. Date: Oct. 18, 2012

(65) Prior Publication Data
US 2014/0144349 A1    May 29, 2014

(51) Int. Cl.
*C04B 7/21* (2006.01)
*C04B 28/08* (2006.01)
*C04B 7/24* (2006.01)
*C04B 28/02* (2006.01)
*C04B 28/14* (2006.01)

(52) U.S. Cl.
CPC ............... *C04B 7/21* (2013.01); *C04B 7/243* (2013.01); *C04B 28/021* (2013.01); *C04B 28/08* (2013.01); *C04B 28/146* (2013.01); *Y02P 40/143* (2015.11); *Y02P 40/145* (2015.11); *Y02W 30/92* (2015.05); *Y02W 30/94* (2015.05)

(58) Field of Classification Search
CPC  C04B 7/21; C04B 7/323; C04B 7/243; C04B 18/08; C04B 18/141; C04B 22/143; C04B 28/021; C04B 28/08; C04B 28/146
See application file for complete search history.

(56) References Cited

U.S. PATENT DOCUMENTS

| 4,404,031 A * | 9/1983 | Sudoh | C04B 28/065 |
| | | | 106/715 |
| 2012/0145045 A1* | 6/2012 | Walenta | C04B 7/323 |
| | | | 106/708 |

FOREIGN PATENT DOCUMENTS

| FR | 2949112 A1 * | 2/2011 |
| KR | 100896005 B1 * | 4/2009 |
| KR | 1020090032729 A * | 4/2009 |

* cited by examiner

*Primary Examiner* — Anthony J Green
(74) *Attorney, Agent, or Firm* — Daniel Feigelson; Fourth Dimension IP

(57) ABSTRACT

A cementitious composition including: a binder containing (a) 60-94%, by weight, of at least one pozzolanic material; (b) at least 0.5% calcium sulfoaluminate (CSA), by weight; (c) 1.2-11% by weight, expressed as $SO_3$, of at least one inorganic sulfate selected from the group of sulfates consisting of a calcium sulfate hemihydrate, an anhydrous calcium sulfate, a calcium sulfate dihydrate, a sodium sulfate, and a sodium calcium sulfate; and (d) a total sulfate content of at least 3%, by weight, expressed as $SO_3$, the cementitious composition including, at most, 3% natural lime, the cementitious composition including, at most, 10% alumina cement, the contents of the composition being calculated on a dry, aggregateless basis.

20 Claims, 1 Drawing Sheet

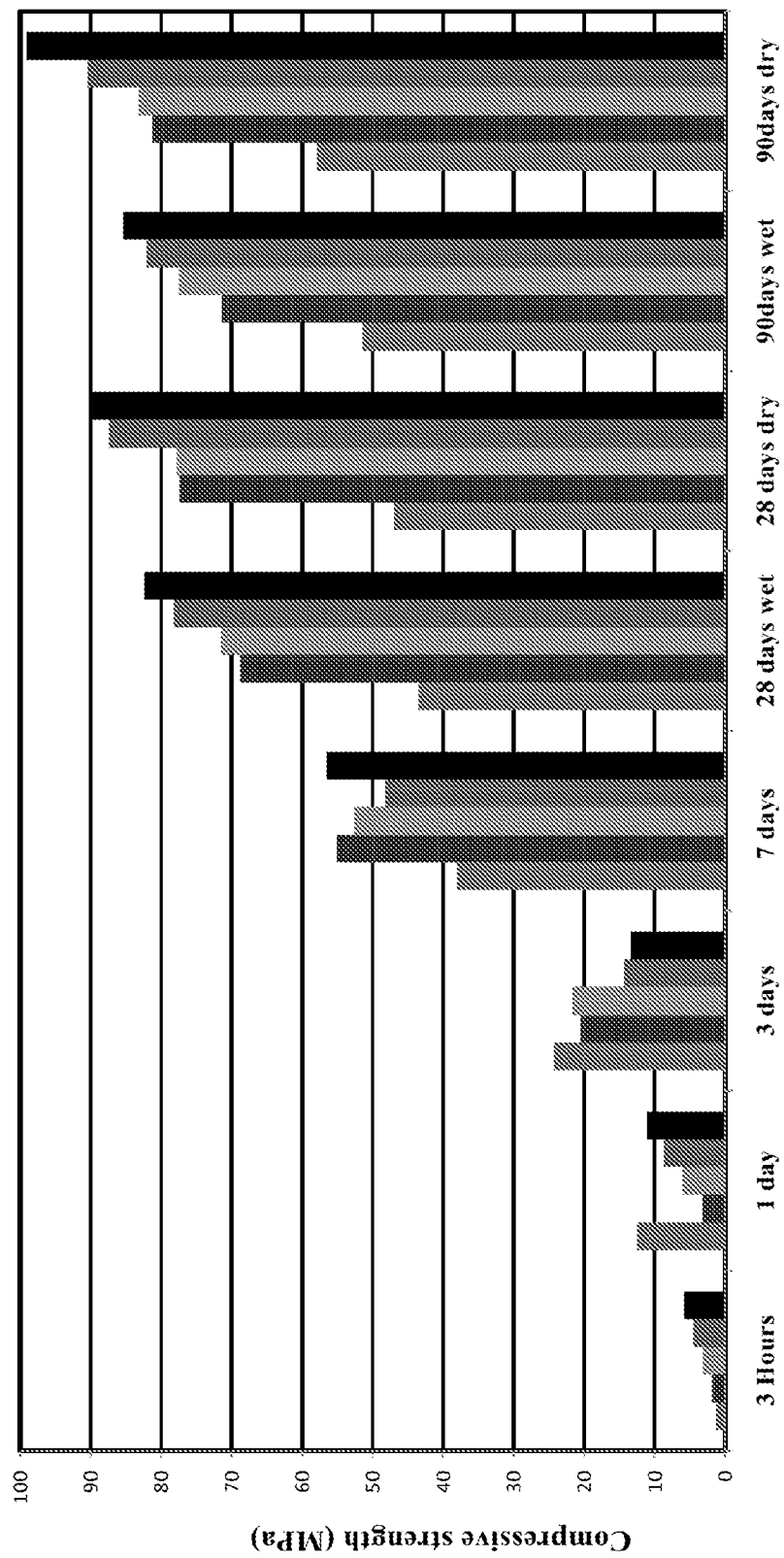

CEMENTITIOUS BINDERS CONTAINING POZZOLANIC MATERIALS

This application is a 35 U.S.C. §371 application of PCT/US2012/033705, filed Apr. 15, 2012 and entitled "CEMENTITIOUS BINDERS CONTAINING POZZOLANIC MATERIALS", and claims priority from British Patent Application Nos. 1205205.6, filed Mar. 25, 2012; 1201266.2 filed Jan. 26, 2012, and 1106345.0, filed Apr. 14, 2011, which applications are incorporated by reference for all purposes as if fully set forth herein.

FIELD AND BACKGROUND OF THE INVENTION

The present invention relates to cementitious binders containing calcium sulfoaluminate and at least one pozzolanic material.

Examples of such pozzolanic material include ground granulated blast furnace slag, fly ash, and silica fume, or natural pozzolans such as calcined shale, calcined clay or metakaolin.

Pozzolanic materials may be categorized as supplementary cementitious materials or as materials having latent hydraulic properties. Fly ash, ground granulated blast-furnace slag, silica fume, and natural pozzolans, such as calcined shale, calcined clay or metakaolin, are materials that, when used in conjunction with a Portland or blended cement, contribute to the properties of the hardened concrete through hydraulic or pozzolanic activity, or both. A pozzolan is a siliceous or alumino-siliceous material, which, in finely divided form and in the presence of moisture, chemically reacts with calcium hydroxide released by the hydration of Portland cement to form calcium silicate hydrate and other cementitious compounds. Because of the slow pozzolanic reaction of some supplementary cementing materials, continuous wet curing and favorable curing temperatures may need to be provided for longer periods than normally required.

For example, it is known that ground granulated blast furnace slag (GGBFS) is considered a latently hydraulic material or binder, exhibiting hydraulic reactivity in the presence of an alkaline activator such as ordinary Portland cement (OPC) and/or a sulfate activator calcium sulfate. In the presence of calcium sulfate, the main hydration products formed are the ettringite and C—S—H phases.

It is also known that in slag cements composed of Portland cement and GGBFS, the early and medium-term mechanical performances fall as the quantity of blast-furnace slag is increased.

M. Michel et al. ("The influence of gypsum ratio on the mechanical performance of slag cement accelerated by calcium sulfoaluminate cement", Construction and Building Materials, Vol. 25, pp 1298-1304 (2011)), disclose cementitious compositions containing GGBFS, OPC, calcium sulfoaluminate (CSA) clinker, and calcium sulfate. The compositions contain 30% OPC, 30% GGBFS, 24-34% calcium sulfoaluminate clinker, the remainder being calcium sulfate.

Korean Patent Document No. KR 10-0931008 discloses a water-permeable paving material comprising 15-25 parts by weight of an inorganic binder, 3-8 parts by weight of water, and 100 parts by weight of aggregate. The binder contains, by weight, 60-80% ultra-micro-granulated blast furnace slag, 5%-20% CSA, 0.5-5% of ethyl-vinyl acetate (EVA) based powder resin, 0.5-10% waste gypsum, and 5-20% natural lime.

Korean Patent Document No. KR 10-0896005 discloses an admixture composite for improving the strength of ready-mix concrete, the admixture containing, by weight, 55-95% fine blast-furnace slag, 2-10% calcium sulfoaluminate, and 3-35% sodium calcium sulfate ($Na_2Ca(SO_4)_2$). Various sulfate sources are contemplated. Preferably, the admixture composite makes up 3-25% of the binder, by weight. The binder typically contains about 50% OPC, by weight. According to KR 10-0896005, the CSA contributes strength by creating large amounts of ettringite when used in combination with Portland cement.

These advances notwithstanding, the present inventors have recognized a need for improved, environmentally friendly, cost-effective, pozzolan-based cementitious compositions, and the subject matter of the present disclosure and claims is aimed at fulfilling this need.

SUMMARY OF THE INVENTION

According to the teachings of the present invention there is provided a cementitious composition including a binder containing: (a) 60-94%, by weight, of at least one pozzolanic material; (b) at least 0.5% calcium sulfoaluminate (CSA), by weight; (c) 1.2-11% by weight, expressed as $SO_3$, of at least one inorganic sulfate selected from the group of sulfates consisting of a calcium sulfate hemihydrate, an anhydrous calcium sulfate, a calcium sulfate dihydrate, a sodium sulfate, and a sodium calcium sulfate; and (d) a total sulfate content of at least 3%, by weight, expressed as $SO_3$; the cementitious composition including, at most, 3% natural lime; the cementitious composition including, at most, 10% alumina cement; the contents of the composition being calculated on a dry, aggregateless basis.

According to further features in the described preferred embodiments, the content of the pozzolanic material within the composition is at least 63%, by weight.

According to still further features in the described preferred embodiments, the content of the pozzolanic material within the composition is at least 67%, by weight.

According to still further features in the described preferred embodiments, the content of the pozzolanic material within the composition is at least 70%, by weight.

According to still further features in the described preferred embodiments, the content of the pozzolanic material within the composition is at least 72%, by weight.

According to still further features in the described preferred embodiments, the content of the pozzolanic material within the composition is at least 75%, by weight.

According to still further features in the described preferred embodiments, the content of the pozzolanic material within the composition is at least 78%, by weight.

According to still further features in the described preferred embodiments, the content of the pozzolanic material within the composition is at least 82%, by weight.

According to still further features in the described preferred embodiments, the content of the pozzolanic material within the composition is at least 84%, by weight.

According to still further features in the described preferred embodiments, the composition includes at most 10.5% of the inorganic sulfate by weight, expressed as $SO_3$.

According to still further features in the described preferred embodiments, the composition includes at most 10% of the inorganic sulfate by weight, expressed as $SO_3$.

According to still further features in the described preferred embodiments, the composition includes at most 9.5% of the inorganic sulfate by weight, expressed as $SO_3$.

According to still further features in the described preferred embodiments, the composition includes at least 1.5% of the inorganic sulfate by weight, expressed as $SO_3$.

According to still further features in the described preferred embodiments, the composition includes at least 1.8% of the inorganic sulfate by weight, expressed as $SO_3$.

According to still further features in the described preferred embodiments, the composition includes at least 2.1% of the inorganic sulfate by weight, expressed as $SO_3$.

According to still further features in the described preferred embodiments, the composition includes at least 2.5% of the inorganic sulfate by weight, expressed as $SO_3$.

According to still further features in the described preferred embodiments, the composition includes at least 0.75% of the CSA.

According to still further features in the described preferred embodiments, the composition includes at least 0.85% of the CSA.

According to still further features in the described preferred embodiments, the composition includes at least 1% of the CSA.

According to still further features in the described preferred embodiments, the composition includes at least 1.2% of the CSA.

According to still further features in the described preferred embodiments, the composition includes at least 1.5% of the CSA.

According to still further features in the described preferred embodiments, the composition includes at least 2% of the CSA.

According to still further features in the described preferred embodiments, the composition includes at least 2.75% of the CSA.

According to still further features in the described preferred embodiments, the composition includes at least 3.5% of the CSA.

According to still further features in the described preferred embodiments, the composition includes at least 4.5% of the CSA.

According to still further features in the described preferred embodiments, the composition includes at least 5.5%, at least 6%, at least 6.5%, at least 7%, at least 7.5%, or at least 8%, of the CSA.

According to still further features in the described preferred embodiments, the composition includes, at most 2%, or at most 1%, natural lime.

According to still further features in the described preferred embodiments, the composition is free or substantially free of natural lime.

According to still further features in the described preferred embodiments, the composition includes at most 7%, at most 5%, at most 3%, at most 2%, or at most 1%, alumina cement.

According to still further features in the described preferred embodiments, the composition is free or substantially free of alumina cement.

According to still further features in the described preferred embodiments, the composition includes at most 0.2% or 0.1% of a polymeric resin.

According to still further features in the described preferred embodiments, the composition includes is free or substantially free of a polymeric resin.

According to still further features in the described preferred embodiments, the composition further includes water, the binder and the water forming a wet cementitious mixture.

According to still further features in the described preferred embodiments, the composition further includes water, the binder and the water forming a wet cementitious paste.

According to still further features in the described preferred embodiments, the content of Ordinary Portland Cement (OPC) within the composition is at most 15%, on a basis of the binder.

According to still further features in the described preferred embodiments, the content of OPC is at most 10%, on the basis of the binder.

According to still further features in the described preferred embodiments, the content of OPC is at most 7%, at most 5%, at most 3%, at most 2%, or at most 1%, on the basis of the binder.

According to still further features in the described preferred embodiments, the composition is free or substantially free of an Ordinary Portland Cement (OPC).

According to still further features in the described preferred embodiments, the composition further includes at least one aggregate material, the binder, the aggregate material and the water forming a wet concrete mixture.

According to still further features in the described preferred embodiments, the combined content of the pozzolanic material, a material containing the CSA, and the inorganic sulfate is at least 85% of the cementitious composition, by weight, on a dry, aggregateless basis.

According to still further features in the described preferred embodiments, this combined content is at least 88%, at least 90%, at least 92%, or at least 95% of the cementitious composition, by weight, on a dry, aggregateless basis.

According to still further features in the described preferred embodiments, the calcium sulfoaluminate includes, largely includes, predominantly includes, or consists essentially of ye'elimite.

According to still further features in the described preferred embodiments, the inorganic sulfate includes, largely includes, predominantly includes, or consists essentially of at least one of a calcium sulfate hemihydrate, an anhydrous calcium sulfate, and a calcium sulfate dihydrate.

According to still further features in the described preferred embodiments, the inorganic sulfate includes, largely includes, predominantly includes, or consists essentially of a calcium sulfate hemihydrate.

According to still further features in the described preferred embodiments, the calcium sulfate hemihydrate includes, largely includes, predominantly includes, or consists essentially of alpha calcium sulfate hemihydrate.

According to still further features in the described preferred embodiments, the calcium sulfate hemihydrate includes, largely includes, predominantly includes, or consists essentially of beta calcium sulfate hemihydrate.

According to still further features in the described preferred embodiments, the inorganic sulfate includes, largely includes, predominantly includes, or consists essentially of anhydrous calcium sulfate.

According to still further features in the described preferred embodiments, the anhydrous calcium sulfate includes, largely includes, predominantly includes, or consists essentially of anhydrite.

According to still further features in the described preferred embodiments, the inorganic sulfate includes, largely includes, predominantly includes, or consists essentially of calcium sulfate dihydrate.

According to still further features in the described preferred embodiments, the content of the pozzolanic material within the composition is at least 72%, a content of calcium sulfoaluminate within the composition is at least 0.75%, the total sulfate content is in a range of 3% to 14%, by weight, calculated as $SO_3$, wherein a combined content of the pozzolanic material, the material containing the CSA, and the inorganic sulfate, is at least 85%, at least 90%, or at least 95% of the cementitious composition, by weight.

According to still further features in the described preferred embodiments, the combined content of the material containing the CSA and the inorganic sulfate within the composition is within a range of 12% to 30%, by weight, on a dry, aggregateless basis.

According to still further features in the described preferred embodiments, the combined content of the CSA and the inorganic sulfate is at least 15%, at least 16.5%, or at least 18%, by weight, on a dry, aggregateless basis.

According to still further features in the described preferred embodiments, the combined content of the CSA and the inorganic sulfate is at most 28%, at most 26%, or at most 24%, by weight, on a dry, aggregateless basis.

According to still further features in the described preferred embodiments, the CSA is disposed within a calcium sulfoaluminate clinker, and the composition includes at least 2.75%, by weight, of the clinker, on a dry, aggregateless basis.

According to still further features in the described preferred embodiments, the composition includes at least 3.5%, at least 4%, at least 4.5%, at least 5.5%, at least 7%, at least 9%, at least 11.5%, at least 13%, at least 15%, at least 18%, at least 20%, at least 22%, at least 25%, at least 28%, or at least 32%, of the clinker.

According to still further features in the described preferred embodiments, the total content of sodium, by weight, is at most 3%, at most 2.5%, at most 2%, at most 1.5%, at most 1%, at most 0.75%, or at most 0.5%, on a dry, aggregateless basis.

According to still further features in the described preferred embodiments, the total sulfate content, expressed as $SO_3$, is at most 15%, at most 14%, at most 13%, or at most 12%, by weight, on a dry, aggregateless basis.

According to still further features in the described preferred embodiments, the water content is at least 10%, at least 15%, at least 20%, at least 25%, at least 30%, at least 35%, or at least 40%, on a weight to weight basis with the binder composition, the binder composition being calculated on a dry, aggregateless basis.

According to still further features in the described preferred embodiments, the belite content of the clinker is at least 5%, at least 10%, at least 15%, at least 20%, at least 30%, or at least 40%, by weight.

According to still further features in the described preferred embodiments, the weight ratio of belite to CSA, within the clinker, is at least 0.2, at least 0.25, at least 0.3, at least 0.4, at least 0.5, at least 0.75, at least 1, at least 1.25, at least 1.5, or at least 1.7.

According to still further features in the described preferred embodiments, the at least one pozzolanic material includes, mainly includes, or consists essentially of ground granular slag.

According to still further features in the described preferred embodiments, the ground granular slag includes, mainly includes, or consists essentially of ground granular blast furnace slag.

According to still further features in the described preferred embodiments, the at least one pozzolanic material includes, or mainly includes, fly ash.

According to still further features in the described preferred embodiments, the composition contains at least 10%, at least 20%, at least 40%, at least 50%, or at least 60% fly ash by weight.

According to still further features in the described preferred embodiments, the at least one pozzolanic material consists essentially of fly ash.

According to still further features in the described preferred embodiments, the at least one pozzolanic material includes ground granular blast furnace slag and fly ash.

According to still further features in the described preferred embodiments, the composition contains at least 10%, at least 20%, at least 40%, at least 50%, or at least 60%, by weight, of the fly ash.

According to still further features in the described preferred embodiments, the at least one pozzolanic material includes ground granular blast furnace slag and fly ash, and the fly ash makes up at least 25%, at least 50%, or at least 75% of the at least one pozzolanic material.

According to still further features in the described preferred embodiments, the at least one pozzolanic material includes ground granular blast furnace slag and fly ash, and a weight ratio of the fly ash to the ground granular blast furnace slag is at least 1:3, at least 1:1, or at least 3:1.

According to still further features in the described preferred embodiments, the fly ash includes, mainly includes, or consists essentially of fly ash type F.

According to still further features in the described preferred embodiments, the fly ash includes, mainly includes, or consists essentially of fly ash type C.

According to still further features in the described preferred embodiments, the concentration of belite, by weight, is at least 0.3%, at least 0.5%, at least 0.7%, at least 0.85%, or at least 1%, on a dry, aggregateless basis.

According to still further features in the described preferred embodiments, the concentration of calcium aluminoferrite, by weight, is at most 3%, at most 2.5%, at most 2%, at most 1.5%, at most 1%, at most 0.75%, or at most 0.5%, on a dry, aggregateless basis.

According to another aspect of the present invention there is provided a method of producing a cementitious composition, including: (a) providing a binder, as described herein; and (b) mixing the binder and the water, to form the wet cementitious mixture.

According to still further features in the described preferred embodiments, the method further includes: (c) mixing an aggregate material with the binder and the water, to form a second wet cementitious mixture.

BRIEF DESCRIPTION OF THE DRAWINGS

The invention is herein described, by way of example only, with reference to the accompanying drawing.

The FIGURE is a bar graph plot showing the development of compressive strength of several exemplary inventive compositions versus a control composition, as a function of time.

DESCRIPTION OF THE PREFERRED EMBODIMENTS

The principles and operation of the cementitious binders according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to M. Michel et al., the industrial development of blast-furnace slag cements such as CEM III has been hindered by their limited mechanical performance, particularly at an early age. M. Michel et al. further disclose that the mechanical performance of slag cements containing more than 70% blast-furnace slag is low with respect to that of Portland cement.

We have surprisingly discovered, however, that blended cements containing at least 60% of at least one pozzolanic material, and in many cases, at least 70%, at least 75%, at least 80%, and at least 85% pozzolans, may have advantageously high ultimate mechanical strengths. Moreover, these inventive pozzolan-based compositions may exhibit high mechanical strengths during the short term and medium term periods, and may preferably exhibit such high mechanical strengths continuously over the entire period during which the cement chemically and mechanically develops.

Thus, according to one aspect of the present invention there is provided a cementitious composition including: 60-94%, by weight, of at least one pozzolanic material; at least 0.5% calcium sulfoaluminate (CSA), by weight; 1.2-11% by weight, expressed as $SO_3$, of at least one inorganic sulfate selected from the group of sulfates consisting of a calcium sulfate hemihydrate, an anhydrous calcium sulfate, a calcium sulfate dihydrate, a sodium sulfate, and a sodium calcium sulfate; and a total sulfate content of at least 3%, by weight, expressed as $SO_3$, the contents of the composition being calculated on a dry, aggregateless basis. The cementitious composition is typically free of natural lime, alumina cement, and polymeric resins.

The at least one pozzolanic material typically includes ground granulated blast furnace slag, which may be at least partially replaced by at least one fly ash (e.g., Type C, Type F). Other pozzolanic materials, including silica fume, metakaolin, calcined shale, calcined clay, or pumice, may at least partially replace the slag, and may be combined with the fly ash. It will be appreciated that such adjustments of the binder formulation may be made, without undue experimentation, by one of ordinary skill in the art.

It is surprising that various mechanical properties of the cement may be appreciably improved by the addition of as little as 0.5%, by weight, calcium sulfoaluminate, on a pure CSA basis. More typically, the content of the calcium sulfoaluminate within the composition may be at least 0.75%, at least 0.85%, at least 1.0%, at least 1.2%, at least 1.5%, at least 2.75%, at least 3%, at least 3.5%, at least 4.5%, or at least 5%. In some cases, the content of the calcium sulfoaluminate within the composition may be at least 5.5%, at least 6%, at least 6.5%, at least 7%, at least 7.5%, or at least 8%.

Calcium sulfoaluminate may be expensive with respect to some pozzolanic materials, gypsum, and various components of cementitious mixtures. We have found that cementitious compositions having superior mechanical and chemical properties may be achieved, while limiting the calcium sulfoaluminate content within the composition to a maximum value of 25%, 20%, 15%, 12%, 10%, 8%, 6%, or 5%, on a pure CSA basis.

Typically, the CSA is disposed within a CSA clinker. The cementitious composition of the present invention may advantageously include at least 2.75%, at least 3.5%, at least 4%, or at least 4.5%, by weight, of the CSA clinker, on a dry, aggregateless basis. More typically, the inventive cementitious composition includes at least 3.5%, at least 4%, at least 4.5%, at least 5.5%, at least 7%, at least 9%, at least 11.5%, at least 13%, at least 15%, at least 18%, at least 20%, at least 22%, at least 25%, at least 28%, or at least 32%, CSA clinker.

The clinker may advantageously contain belite. The belite content within the clinker may be at least 5%, at least 10%, at least 15%, at least 20%, at least 30%, or at least 40%, by weight. Typically, the belite content within the clinker may be within a range of 12-60%, by weight.

The weight ratio of belite to CSA, within the clinker, or within the cementitious composition, may be at least 0.2, at least 0.25, at least 0.3, at least 0.4, at least 0.5, at least 0.75, at least 1, at least 1.25, at least 1.5, or at least 1.7.

The CSA clinker used in accordance with the present invention may be devoid or substantially devoid of calcium aluminoferrite $[(Ca_2(Al,Fe)_2O_5)]$. The CSA clinker used in accordance with the present invention may contain less than 10%, less than 7%, less than 4%, less than 2.5%, or less than 1% calcium aluminoferrite.

The amount of iron, expressed as iron oxide, within the clinker, may be less than 7%, less than 5%, or less than 3%, and more typically, may be less than 2.8%, less than 2.5%, less than 1.5%, less than 1%, less than 0.75%, or less than 0.5%. The iron concentration in the inventive binder may be heavily dependent on the source of the various raw materials. For example, various fly ash products may contain at least several percent iron oxide. Various slag compositions may contain lesser amounts of iron oxide, e.g., at least 0.2% or at least 0.4%, but often less than 1%.

The early strength of the cement may be improved by the addition of an inorganic sulfate compound, typically anhydrite ($CaSO_4$), gypsum ($CaSO_4 \cdot 2H_2O$), hemihydrate ($CaSO_4 \cdot \frac{1}{2}H_2O$) or other sulfate sources such as glauberite ($Na_2Ca(SO_4)_2$) and sodium sulfate ($Na_2SO_4$). Such sulfate containing materials have been found to improve the early strength to varying extents, depending on their solubility and solubility kinetics. The total sulfate content, calculated as $SO_3$, is at least 2.5%, by weight, including the sulfate content attributed to the calcium sulfoaluminate, to the pozzolanic material, and to any OPC or other components. More typically, the total sulfate content, calculated as $SO_3$, may be at least 3%, at least 4%, at least 5%, at least 7%, or at least 10%, by weight.

An excess of sulfate may deleteriously affect the ultimate strength of the cementitious composition. We have found that the total sulfate content within the composition, expressed as $SO_3$, should be at most 15%, and more typically, no more than 11%, 10%, or 9%, by weight.

Without wishing to be limited by theory, the inventors believe that such an excess of sulfate produces, promotes, or is otherwise associated a high specific pore volume, which reduces the strength of the cementitious composition.

The inventors have found that in the production of the inventive binder, carbon dioxide emissions are reduced with respect to the production of Ordinary Portland Cements.

EXAMPLES

Reference is now made to the following examples, which together with the above description, illustrate the invention in a non-limiting fashion.

Example 1

As a control, a cementitious binder of the prior art was prepared, containing 100% Type III OPC, and weighing 450 grams. The binder was mixed with 1,350 grams of standard sand according to the EN standard 197 to produce a mixture containing 25% binder and 75% sand. The dry blend was mixed with 189 grams water and 0.7 grams Melment® F10, a powdered super plasticizer based on a water-soluble sulfonated melamine polycondensate.

Sets of test cubes were prepared, one set for measuring the compressive strength at 3 hours and at 24 hours, and two sets for evaluating compressive strengths at 3, 7, 28 and 90 days.

Example 2

As a control, a cementitious binder of the prior art was prepared, containing 80% ground granulated blast furnace slag grounded ($d_{50}$=3.5μ) and 15% calcium sulfate dihydrate and 5% Portland cement (CEM I 52.5). The binder, weighing 450 grams, was mixed with 1,350 grams of sand, as in Example 1, to produce a mixture containing 25% binder and 75% sand. To the mixture were added 189 grams water and 2.5 grams Melment® F10. Sets of test cubes were prepared, one set for measuring the compressive strength at 3 hours and at 24 hours, and two sets for evaluating the compressive strength at 3, 7, 28 and 90 days.

Table 1 provides the compressive strength developed by Examples 1 and 2, as a function of time.

TABLE 1

| | Example No. | |
|---|---|---|
| | 1 Control 1 | 2 Control 2 |
| | (wt. %) | |
| OPC (CEM I 52.5) | 100 | 5 |
| Slag $d_{50}$ = 3.5 μ | | 80 |
| Calcium Sulfate Dihydrate | | 15 |
| Binder | 25 | 25 |
| Standard Sand | 75 | 75 |
| time | Compressive Strength (MPa) | |
| 3 hours | 0 | 1.25 |
| 1 day | 19.2 | 12.5 |
| 3 days | 39.8 | 24.2 |
| 7 days | 58.1 | 38.0 |
| 28 days | 76.0 | 46.9 |

Example 3

A cementitious binder was prepared, containing 80% ground granulated blast furnace slag ($d_{50}$=3.5μ), 15% alpha calcium sulfate hemihydrate and 5% of a calcium sulfoaluminate cement or clinker having the following mineralogical composition:

| | |
|---|---|
| Alite | 5.2% |
| Belite | 45.7% |
| Anhydrite | 14.0% |
| Ye'elimite | 26.2% |
| Andradite $Ca_3Fe_2(SiO_4)_3$ | 6.5% |
| Portlandite | 2.2% |
| Calcium Aluminum Iron Oxide Sulfate | trace |
| Calcium Phosphide | trace |

(Unless specified otherwise, this is the composition of the CSA clinker utilized in all of the Examples.) The ratio of CSA to belite in this composition was about 1.7:1.

Thus, the concentration of CSA within the cementitious binder was about 1.3% (5%×26%). The binder, weighing 450 grams, was mixed with 1,350 grams of sand, as in Example 1, to produce a mixture containing 25% binder and 75% sand. To the mixture were added 189 grams water and 2.5 grams Melment® F10.

Sets of test cubes were prepared, one set for measuring the compressive strength at 3 hours and at 24 hours, and two sets for evaluating the compressive strengths at 3, 7, 28 and 90 days.

The slags used in Example 3-17 had the following chemical composition:

| | |
|---|---|
| CaO | 38-45% |
| $SiO_2$ | 32-40% |
| $Al_2O_3$ | 10-15% |
| $Fe_2O_3$ | 0.5-1.5% |
| MgO | 6-9% |
| $TiO_2$ | 0.5-1% |
| $K_2O$ | 0.5-1% |
| $Na_2O$ | 0.2-0.5% |
| $Mn_2O_3$ | 0-1.5% |
| $SO_3$ | 0.1-2% |
| LOI (total) | 0.5-3% |

Example 4

A cementitious binder was prepared, containing 80% ground granulated blast furnace slag ($d_{50}$=3.5μ), 15% calcium sulfate dihydrate ($CaSO_4.2H_2O$) produced by flue gas desulfurization (FGD), and 5% calcium sulfoaluminate cement. The binder, weighing 450 grams, was mixed with 1,350 grams of sand, as in Example 1, to produce a mixture containing 25% binder and 75% sand. To the mixture were added 189 grams water and 1.5 grams Melment® F10.

Sets of test cubes were prepared, one set for measuring the compressive strength at 3 hours and at 24 hours, and two sets for evaluating the compressive strengths at 3, 7, 28 and 90 days.

Example 5

A cementitious binder was prepared, containing 80% ground granulated blast furnace slag ($d_{50}$=3.5μ), 15% anhydrous calcium sulfate ($CaSO_4$, or anhydrite), and 5% calcium sulfoaluminate cement ("CSA clinker"). The binder, weighing 450 grams, was mixed with 1,350 grams of sand, as in Example 1, to produce a mixture containing 25% binder and 75% sand. To the mixture were added 189 grams water and 1.8 grams Melment® F10.

Sets of test cubes were prepared, one set for measuring the compressive strength at 3 hours and at 24 hours, and two sets for evaluating the compressive strengths at 3, 7, 28 and 90 days.

Table 2 provides the compressive strength developed by Examples 3-5, as a function of time.

Example 6

A cementitious binder was prepared, containing 80% ground granulated blast furnace slag ($d_{50}$=13μ), 15% alpha calcium sulfate hemihydrate and 5% calcium sulfoaluminate cement. The binder, weighing 450 grams, was mixed with 1,350 grams of sand, as in Example 1, to produce a mixture containing 25% binder and 75% sand. To the mixture were added 189 grams water and 2.5 grams Melment® F10. Sets of test cubes were prepared, one set for measuring the compressive strength at 3 hours and at 24 hours, and two sets for evaluating the compressive strengths at 3, 7, 28 and 90 days.

Table 3 provides the compressive strength developed by Examples 3 and 6, as a function of time.

TABLE 2

| | Example No. | | |
|---|---|---|---|
| | 3 | 4 | 5 |
| | | (wt. %) | |
| Slag $d_{50}$ = 3.5 μ | 80 | 80 | 80 |
| Alpha Hemihydrate | 15 | | |
| Dihydrate | | 15 | |
| Anhydrite | | | 15 |
| CSA clinker | 5 | 5 | 5 |
| Binder | 25 | 25 | 25 |
| Standard Sand | 75 | 75 | 75 |
| time | Compressive Strength (MPa) | | |
| 3 Hours | 1.85 | 0 | 0.4 |
| 1 day | 3 | 1.6 | 1.2 |
| 3 days | 9.5 | 33 | 24 |
| 7 days | 54 | 40 | 36 |
| 28 days | 79 | 56 | 51 |
| 90 days | 85 | 61 | 69 |

TABLE 3

| | Example No. | |
|---|---|---|
| | 3 | 6 |
| | (wt. %) | |
| Slag ($d_{50}$ = 3.5 μ) | 80 | |
| Slag ($d_{50}$ = 13 μ) | | 80 |
| Alpha Hemihydrate | 15 | 15 |
| CSA clinker | 5 | 5 |
| Binder | 25 | 25 |
| Standard Sand | 75 | 75 |
| time | Compressive Str. (MPa) | |
| 3 Hours | 1.85 | 1.9 |
| 1 day | 3.1 | 3.2 |
| 3 days | 9.5 | 20.5 |
| 7 days | 53.7 | 55.1 |
| 28 days | 79 | 77.4 |
| 90 days | 85.4 | 81.2 |

Example 7

A cementitious binder was prepared, containing 75% ground granulated blast furnace slag ($d_{50}$=3.5μ), 15% alpha calcium sulfate hemihydrate, and 10% calcium sulfoaluminate cement. The binder, weighing 450 grams, was mixed with 1,350 grams of sand, as in Example 1, to produce a mixture containing 25% binder and 75% sand. To the mixture were added 189 grams water and 2.4 grams Melment® F10.

Sets of test cubes were prepared, one set for measuring the compressive strength at 3 hours and at 24 hours, and two sets for evaluating the compressive strengths at 3, 7, 28 and 90 days.

Example 8

A cementitious binder was prepared, containing 70% ground granulated blast furnace slag ($d_{50}$=3.5μ), 15% alpha calcium sulfate hemihydrate, and 15% calcium sulfoaluminate cement. The binder, weighing 450 grams, was mixed with 1,350 grams of sand, as in Example 1, to produce a mixture containing 25% binder and 75% sand. To the mixture were added 189 grams water and 2.4 grams Melment® F10.

Sets of test cubes were prepared, one set for measuring the compressive strength at 3 hours and at 24 hours, and two sets for evaluating the compressive strengths at 3, 7, 28 and 90 days.

Example 9

A cementitious binder was prepared, containing 65% ground granulated blast furnace slag ($d_{50}$=3.5μ), 15% alpha calcium sulfate hemihydrate, and 20% calcium sulfoaluminate cement. The binder, weighing 450 grams, was mixed with 1,350 grams of sand, as in Example 1, to produce a mixture containing 25% binder and 75% sand. To the mixture were added 189 grams water and 4.0 grams Melment® F10.

Sets of test cubes were prepared, one set for measuring the compressive strength at 3 hours and at 24 hours, and two sets for evaluating the compressive strengths at 3, 7, 28 and 90 days.

Table 4 provides the compressive strength developed by Examples 3, and 7-9, as a function of time.

TABLE 4

| | Example No. | | | |
|---|---|---|---|---|
| | 3 | 7 | 8 | 9 |
| | | (wt. %) | | |
| Slag ($d_{50}$ = 3.5 μ) | 80 | 75 | 70 | 65 |
| Calcium Sulfate Hemihydrate | 15 | 15 | 15 | 15 |
| CSA clinker | 5 | 10 | 15 | 20 |
| Binder | 25 | 25 | 25 | 25 |
| Standard Sand | 75 | 75 | 75 | 75 |
| time | Compressive Strength (MPa) | | | |
| 3 hours | 1.85 | 3.1 | 4.53 | 5.75 |
| 1 day | 3.1 | 6 | 8.7 | 11.1 |
| 3 days | 9.5 | 21.6 | 14.3 | 13.4 |
| 7 days | 53.7 | 52.6 | 48.2 | 56.5 |
| 28 days | 79 | 77.8 | 87.4 | 90.2 |
| 90 days | 85.4 | 83.2 | 90.4 | 99.1 |

The FIGURE is a comparative bar graph plot showing, from left to right, the development of compressive strength of Examples 2 (a control sample containing 80% GGBFS), 3, 7, 8, and 9, as a function of time. Measurements of the compressive strength were taken at 3 hours, 1 day, 3 days, 7 days, 28 days (wet and dry) and 90 days (wet and dry).

Example 10

A cementitious binder was prepared, containing 75% ground granulated blast furnace slag ($d_{50}$=3.5μ), 15% anhydrous calcium sulfate (anhydrite), and 10% calcium sulfoaluminate cement. The binder, weighing 450 grams, was mixed with 1,350 grams of sand, as in Example 1, to produce a mixture containing 25% binder and 75% sand. To the mixture were added 189 grams water and 5.0 grams Melment® F10.

Sets of test cubes were prepared, one set for measuring the compressive strength at 3 hours and at 24 hours, and two sets for evaluating the compressive strengths at 3, 7, 28 and 90 days.

Table 5 provides the compressive strength developed by Example 10, as a function of time.

TABLE 5

| time | Compressive Strength (MPa) |
|---|---|
| 3 hours | 2.2 |
| 1 day | 5.2 |
| 3 days | 7 |
| 7 days | 35 |
| 28 days | 65 |
| 90 days | 87 |

Example 11

A cementitious binder was prepared, containing 20% ground granulated blast furnace slag ($d_{50}$=4.5μ), 60% fly ash type F, 15% alpha calcium sulfate hemihydrate, and 5% calcium sulfoaluminate clinker. The binder, weighing 450 grams, was mixed with 1,350 grams of sand, as in Example 1, to produce a mixture containing 25% binder and 75% sand. To the mixture were added 212 grams water.

The fly ash type F used in Example 11, and in Examples 12-17 below, had the following chemical composition:

| | |
|---|---|
| CaO | 2.98% |
| $SiO_2$ | 56.84% |
| $Al_2O_3$ | 22.31% |
| $Fe_2O_3$ | 7.44% |
| MgO | 1.74% |
| $TiO_2$ | 0.97% |
| $K_2O$ | 1.56% |
| $Na_2O$ | 1.23% |
| $P_2O_5$ | 0.4% |
| $Mn_2O_3$ | 0.06% |
| $SO_3$ | 0.52% |

Test cubes were prepared for measuring the compressive strength at 3 hours and at 24 hours, and at 2, 7, 28 and 90 days.

Table 6 provides the compressive strength developed by Example 11, as a function of time.

Example 12

A cementitious binder was prepared, containing 40% ground granulated blast furnace slag ($d_{50}$=4.5μ), 40% fly ash type F, 15% alpha calcium sulfate hemihydrate, and 5% calcium sulfoaluminate cement. The binder, weighing 450 grams, was mixed with 1,350 grams of sand, as in Example 1, to produce a mixture containing 25% binder and 75% sand. To the mixture were added 212 grams water.

Test cubes were prepared for measuring the compressive strength at 3 hours and at 24 hours, and at 2, 7, 28 and 90 days.

Table 6 provides the compressive strength developed by Example 12, as a function of time.

Example 13

A cementitious binder was prepared, containing 60% ground granulated blast furnace slag ($d_{50}$=4.5μ), 20% fly ash type F, 15% alpha calcium sulfate hemihydrate, and 5% calcium sulfoaluminate cement. The binder, weighing 450 grams, was mixed with 1,350 grams of sand, as in Example 1, to produce a mixture containing 25% binder and 75% sand. To the mixture were added 212 grams water.

Test cubes were prepared for measuring the compressive strength at 3 hours and at 24 hours, and at 2, 7, 28 and 90 days.

Table 6 provides the compressive strength developed by Example 13, as a function of time.

Example 14

A cementitious binder was prepared, containing 65% fly ash type F, 15% alpha calcium sulfate hemihydrate, and 20% calcium sulfoaluminate cement. The binder, weighing 450 grams, was mixed with 1,350 grams of sand, as in Example 1, to produce a mixture containing 25% binder and 75% sand. To the mixture were added 212 grams water.

Test cubes were prepared for measuring the compressive strength at 3 hours and at 24 hours, and at 2, 7, 28 and 90 days.

Table 7 provides the compressive strength developed by Example 14, as a function of time.

TABLE 6

| | Example No. | | |
|---|---|---|---|
| | 11 | 12 | 13 |
| | (wt. %) | | |
| Slag ($d_{50}$ = 4.5 μ) | 20 | 40 | 60 |
| Fly Ash type F | 60 | 40 | 20 |
| Alpha Hemihydrate | 15 | 15 | 15 |
| CSA clinker | 5 | 5 | 5 |
| Binder | 25 | 25 | 25 |
| Standard Sand | 75 | 75 | 75 |
| time | Compressive Strength (MPa) | | |
| 3 hours | 0.8 | 1 | 1.1 |
| 1 day | 1.5 | 2 | 2.3 |
| 3 days | 3.3 | 12.4 | 17.2 |
| 7 days | 25.4 | 38.7 | 45.4 |
| 28 days | 39.4 | 53.5 | 62.2 |

Example 15

A cementitious binder was prepared, containing 15% ground granulated blast furnace slag ($d_{50}$=4.5μ), 50% Fly Ash type F, 15% alpha calcium sulfate hemihydrate, and 20% calcium sulfoaluminate cement. The binder, weighing 450 grams, was mixed with 1,350 grams of sand, as in Example 1, to produce a mixture containing 25% binder and 75% sand. To the mixture were added 212 grams water.

Test cubes were prepared for measuring the compressive strength at 3 hours and at 24 hours, and at 2, 7, 28 and 90 days.

Table 7 provides the compressive strength developed by Example 15, as a function of time.

Example 16

A cementitious binder was prepared, containing 30% ground granulated blast furnace slag ($d_{50}$=4.5μ), 35% Fly Ash type F, 15% alpha calcium sulfate hemihydrate, and 20% calcium sulfoaluminate cement. The binder, weighing 450 grams, was mixed with 1,350 grams of sand, as in Example 1, to produce a mixture containing 25% binder and 75% sand. To the mixture were added 212 grams water.

Test cubes were prepared for measuring the compressive strength at 3 hours and at 24 hours, and at 2, 7, 28 and 90 days.

Table 7 provides the compressive strength developed by Example 16, as a function of time.

Example 17

A cementitious binder was prepared, containing 50% ground granulated blast furnace slag ($d_{50}$=4.5μ), 15% Fly Ash type F, 15% alpha calcium sulfate hemihydrate, and 20% calcium sulfoaluminate cement. The binder, weighing 450 grams, was mixed with 1,350 grams of sand, as in Example 1, to produce a mixture containing 25% binder and 75% sand. To the mixture were added 212 grams water.

Test cubes were prepared for measuring the compressive strength at 3 hours and at 24 hours, and at 2, 7, 28 and 90 days.

Table 7 provides the compressive strength developed by Example 17, as a function of time.

TABLE 7

| | Example No. | | | |
|---|---|---|---|---|
| | 14 | 15 | 16 | 17 |
| | | (wt. %) | | |
| Slag ($d_{50}$ = 4.5 μ) | | 15 | 30 | 50 |
| Fly Ash type F | 65 | 50 | 35 | 15 |
| Alpha Hemihydrate | 15 | 15 | 15 | 15 |
| CSA clinker | 20 | 20 | 20 | 20 |
| Binder | 25 | 25 | 25 | 25 |
| Standard Sand | 75 | 75 | 75 | 75 |
| time | Compressive Strength (MPa) | | | |
| 3 hours | 2.5 | 2.3 | 2.6 | 2.9 |
| 1 day | 5.3 | 5.6 | 6.2 | 6.6 |
| 3 days | 7.1 | 10.1 | 16.6 | 20.4 |
| 7 days | 18.8 | 32.6 | 46.3 | 53.3 |
| 28 days | 27.7 | 49.4 | 60.5 | 70.2 |

Example 18

A cementitious binder was prepared, containing 32.5% ground granulated blast furnace slag ($d_{50}$=5μ), 32.5% Fly Ash type F, 15% anhydrous calcium sulfate (anhydrite), and 20% calcium sulfoaluminate cement. The binder, weighing 450 grams, was mixed with 1,350 grams of sand, as in Example 1, to produce a mixture containing 25% binder and 75% sand. To the mixture were added 216 grams water.

The slag used had the following chemical composition, based on a standard XRF characterization:

| | |
|---|---|
| CaO | 42.0% |
| $SiO_2$ | 32.2% |
| $Al_2O_3$ | 14.2% |
| $Fe_2O_3$ | 0.6% |
| MgO | 6.5% |
| $TiO_2$ | 0.5% |
| $K_2O$ | 0.29% |
| $Na_2O$ | 0.16% |
| $P_2O_5$ | 0.00% |
| $Mn_2O_3$ | 0.29% |
| $SO_3$ | 1.8% |

Test cubes were prepared for measuring the compressive strength at 3 hours and at 24 hours, and at 2, 7, 28 and 90 days.

Table 8 provides the compressive strength developed by Example 18, as a function of time.

Example 19

A cementitious binder was prepared, containing 40% ground granulated blast furnace slag ($d_{50}$=5μ), 40% Fly Ash type F, 15% anhydrous calcium sulfate (anhydrite), and 5% calcium sulfoaluminate cement. The binder, weighing 450 grams, was mixed with 1,350 grams of sand, as in Example 1, to produce a mixture containing 25% binder and 75% sand. To the mixture were added 216 grams water.

The slag used had the following chemical composition, based on a standard XRF characterization:

| | |
|---|---|
| CaO | 41.2% |
| $SiO_2$ | 35.9% |
| $Al_2O_3$ | 10.6% |
| $Fe_2O_3$ | 0.6% |
| MgO | 7.7% |
| $TiO_2$ | 0.6% |
| $K_2O$ | 0.35% |
| $Na_2O$ | 0% |
| $P_2O_5$ | 0.01% |
| $Mn_2O_3$ | 0.42% |
| $SO_3$ | 1.5% |

Test cubes were prepared for measuring the compressive strength at 3 hours and at 24 hours, and at 2, 7, 28 and 90 days.

Table 8 provides the compressive strength developed by Example 19, as a function of time.

Example 20

A cementitious binder was prepared, containing 75% ground granulated blast furnace slag ($d_{50}$=3.6μ), 10% anhydrous calcium sulfate (anhydrite) and 15% of a calcium sulfoaluminate cement or clinker (Alipre #1, Italy) having the following mineralogical composition: 18% belite, 60% Ye'elimite, and 9% of a calcium sulfate. Thus, the ratio of CSA to belite in this CSA clinker was about 3.3:1.

The content of CaO, $SiO_2$, $Al_2O_3$, and $SO_3$ in the composition is provided in Table 9 hereinbelow. Also provided are the concentrations of these components in the other CSA clinkers referenced herein.

TABLE 8

| | Example No. | |
|---|---|---|
| | 18 | 19 |
| | (wt. %) | |
| Slag ($d_{50}$ = 4.5 μ) | 32.5 | 40 |
| Fly Ash type F | 32.5 | 40 |

TABLE 8-continued

| | | |
|---|---|---|
| Anhydrite | 15 | 15 |
| CSA clinker | 20 | 5 |
| Binder | 25 | 25 |
| Standard Sand | 75 | 75 |

| time | Compressive Strength (MPa) | |
|---|---|---|
| 3 hours | 1.81 | 0.39 |
| 1 day | 4.63 | 1.46 |
| 3 days | 16.26 | 9.91 |
| 7 days | 46 | 27.03 |
| 28 days | 59.4 | 37.08 |

TABLE 9

| Chemical composition | CaO | SiO$_2$ | Al$_2$O$_3$ | SO$_3$ |
|---|---|---|---|---|
| CSA clinker-Example 3 | 49.08 | 14.18 | 16.27 | 14.07 |
| CSA clinker-Example 20 | 39-43 | 7.5 | 31-43 | 12.5-17.5 |
| CSA Binder-III (Tangshan Polar Bear Building Materials Co., LTD., China) | 41.65 | 6.95 | 34.52 | 8.46 |

Thus, the concentration of CSA within the cementitious binder was about 2.7% (15%×18%). The binder, weighing 900 grams, was mixed with 2,700 grams of sand, to produce a mixture containing 25% binder and 75% sand. To the mixture were added 378 grams water and 5 grams Melment® F10.

Test cubes were prepared for measuring the compressive strength at 3 hours and at 24 hours, and at 2, 7, 28 and 90 days.

Table 10 provides the compressive strength developed by Example 20, as a function of time.

Examples 21-22

Example 20 was repeated, with 0.28 grams and 0.87 grams of citric acid being added in Example 21 and Example 22, respectively.

Test cubes were prepared for measuring the compressive strength at 3 hours and at 24 hours, and at 2, 7, 28 and 90 days.

The compressive strength developed by Examples 21 and 22, as a function of time, are provided in Table 10.

TABLE 10

| | Example No. | | |
|---|---|---|---|
| | 20 | 21 | 22 |
| | | (wt. %) | |
| fine Italian slag (D50 = 3.6 μm) | 75 | 75 | 75 |
| Anhydrite | 10 | 10 | 10 |
| CSA (Alipre #1) | 15 | 15 | 15 |
| F10 MELMENT (g) | 5 | 5 | 5 |
| citric acid (g) | 0 | 0.28 | 0.87 |
| Water cc | 378 | 378 | 378 |
| water/cement ratio | 0.42 | 0.42 | 0.42 |
| time | Compressive Strength-MPa | | |
| 3 hours | 3.1 | 1.95 | 0.94 |
| 1 day | 7 | 4.3 | 9.13 |
| 3 days | 10.5 | 8.3 | 14.1 |
| 7 days | 15.07 | 11.77 | 19.42 |
| 28 days dry | 28.8 | 36 | 44.1 |
| 90 days dry | 53.6 | 65.8 | 63.6 |

In the specification and in the claims section that follows, the term ordinary Portland cement (OPC), when used in the general sense, is meant to refer to various Portland cements recognized by those of skill in the art to be considered Ordinary Portland Cement, and is specifically meant to include white ordinary Portland cement (WOPC).

As used herein in the specification and in the claims section that follows, the term "calcium sulfoaluminate", or "CSA", used as a complete expression, refers to the chemical species calcium sulfoaluminate. A predominant form of calcium sulfoaluminate may be represented by 3CaO.3Al$_2$O$_3$.CaSO$_4$. The term "calcium sulfoaluminate" is meant to refer to both natural (e.g., ye'elimite) and synthetic calcium sulfoaluminates.

As used herein in the specification and in the claims section that follows, the term "calcium sulfoaluminate cement", "calcium sulfoaluminate clinker" or abbreviations thereof (such as "CSA clinker"), refer to a cement or clinker containing the chemical species "calcium sulfoaluminate".

As used herein in the specification and in the claims section that follows, the term "material containing calcium sulfoaluminate", or "material containing CSA", refers to a CSA clinker, a CSA-based ore containing ye'elimite, or to pure or substantially pure CSA.

As used herein in the specification and in the claims section that follows, the term "percent", or "%", refers to percent by weight, unless specifically indicated otherwise.

Similarly, the term "ratio", as used herein in the specification and in the claims section that follows, refers to a weight ratio, unless specifically indicated otherwise.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A cementitious composition comprising:
    a binder containing:
    (a) 72-94%, by weight, of ground granular blast furnace slag (GGBFS);
    (b) at least 0.5% calcium sulfoaluminate (CSA), by weight, said CSA having the structure 3CaO.3Al$_2$O$_3$.CaSO$_4$;
    (c) 1.2-11% by weight, expressed as SO$_3$, of at least one inorganic sulfate selected from the group of sulfates consisting of a calcium sulfate hemihydrate, an anhydrous calcium sulfate, a calcium sulfate dihydrate, a sodium sulfate, and a sodium calcium sulfate; and (d) a total sulfate content of at least 3%, and at most 11%, by weight, expressed as $SO_3$;

the cementitious composition comprising, at most, 3% natural lime;

the cementitious composition comprising, at most, 3% alumina cement;

the cementitious composition comprising, at most 3% of an Ordinary Portland Cement (OPC);

the cementitious composition comprising, at most, 5% of said CSA;

the contents of the composition being calculated on a dry, aggregateless basis.

2. The cementitious composition of claim 1, wherein said content of said ground granular blast furnace slag within the composition is at least 75%, by weight.

3. The cementitious composition of claim 1, wherein said content of said ground granular blast furnace slag within the composition is at least 78%, by weight.

4. The cementitious composition of claim 1, wherein said content of said ground granular blast furnace slag within the composition is at least 82%, by weight.

5. The cementitious composition of claim 1, the composition comprising at least 1.5% of said inorganic sulfate by weight, expressed as $SO_3$.

6. The cementitious composition of claim 1, the cementitious composition comprising, at most, 0.2% of a polymeric resin, by weight.

7. The cementitious composition of claim 1, further comprising water, said binder and said water forming a wet cementitious mixture.

8. The cementitious composition of claim 7, wherein a content of an Ordinary Portland Cement (OPC) within the composition is at most 2%, on a basis of said binder.

9. The cementitious composition of claim 8, wherein said content of OPC is at most 1%, on said basis of said binder.

10. The cementitious composition of claim 7, further comprising at least one aggregate material, said binder, said aggregate material and said water forming a wet concrete mixture.

11. The cementitious composition of claim 1, wherein a combined content of said ground granular blast furnace slag, a material containing said CSA, and said inorganic sulfate is at least 85% of the cementitious composition, by weight, on said dry, aggregateless basis.

12. The cementitious composition of claim 1, wherein a content of said calcium sulfoaluminate within the composition is at least 0.75%, and a combined content of said ground granular blast furnace slag, a material containing said CSA, and said inorganic sulfate, is at least 85% of the cementitious composition, by weight.

13. The cementitious composition of claim 1, wherein a combined content of a material containing said CSA and said inorganic sulfate within the composition is within a range of 12% to 30%, by weight, on said dry, aggregateless basis.

14. The cementitious composition of claim 1, said CSA disposed within a calcium sulfoaluminate clinker, the composition comprising at least 2.75%, by weight, of said clinker, on said dry, aggregateless basis.

15. The cementitious composition of claim 1, wherein said content of said ground granular blast furnace slag within the composition is at least 84%, by weight.

16. The cementitious composition of claim 1, wherein a content of said calcium sulfoaluminate ($3CaO.3Al_2O_3.CaSO_4$) within the composition is at least 0.75%, wherein a combined content of said GGBFS, a material containing said calcium sulfoaluminate ($3CaO.3Al_2O_3.CaSO_4$), and said inorganic sulfate, is at least 90% of the cementitious composition, by weight.

17. The cementitious composition of claim 1, wherein said inorganic sulfate predominantly includes at least one of said calcium sulfate hemihydrate, said anhydrous calcium sulfate, and said calcium sulfate dihydrate.

18. A cementitious composition comprising:

a binder containing:

(a) 72-94%, by weight, of ground granular blast furnace slag (GGBFS);

(b) at least 0.5% calcium sulfoaluminate (CSA), by weight, said CSA having the structure $3CaO.3Al_2O_3.CaSO_4$;

(c) 1.2-11% by weight, expressed as $SO_3$, of at least one inorganic sulfate selected from the group of sulfates consisting of a calcium sulfate hemihydrate, an anhydrous calcium sulfate, a calcium sulfate dihydrate, a sodium sulfate, and a sodium calcium sulfate; and (d) a total sulfate content of at least 3%, and at most 11%, by weight, expressed as $SO_3$;

the cementitious composition comprising, at most, 3% natural lime;

the cementitious composition comprising, at most, 3% alumina cement;

the cementitious composition comprising, at most 3% of an Ordinary Portland Cement (OPC);

the cementitious composition comprising, at most, 5% of said CSA;

the contents of the composition being calculated on a dry, aggregateless basis;

the cementitious composition further comprising water; said binder and said water forming a wet cementitious mixture.

19. A cementitious composition comprising:

a binder containing:

(a) 72-94%, by weight, of ground granular blast furnace slag (GGBFS);

(b) at least 0.5% calcium sulfoaluminate (CSA), by weight, said CSA having the structure $3CaO.3Al_2O_3.CaSO_4$;

(c) 1.2-11% by weight, expressed as $SO_3$, of at least one inorganic sulfate selected from the group of sulfates consisting of a calcium sulfate hemihydrate, an anhydrous calcium sulfate, a calcium sulfate dihydrate, a sodium sulfate, and a sodium calcium sulfate; and (d) a total sulfate content of at least 3%, and at most 11%, by weight, expressed as $SO_3$;

the cementitious composition comprising, at most, 3% natural lime;

the cementitious composition comprising, at most, 3% alumina cement;

the cementitious composition comprising, at most 2% of an Ordinary Portland Cement (OPC);

the cementitious composition comprising, at most, 5% of said CSA;

the contents of the composition being calculated on a dry, aggregateless basis.

20. The cementitious composition of claim 19, wherein said inorganic sulfate predominantly includes at least one of said calcium sulfate hemihydrate, said anhydrous calcium sulfate, and said calcium sulfate dihydrate, and wherein within the composition, the total content of sodium, by weight, is at most 2%, on a dry, aggregateless basis, and wherein said total sulfate content is most 9%, by weight.

* * * * *